United States Patent [19]

White et al.

[11] 4,222,601
[45] Sep. 16, 1980

[54] AUTOMOBILE COMPARTMENT COVER

[75] Inventors: James E. White, Troy; Ronald S. Gulette, Farmington Hills; Walter M. Wheeler, Frazer, all of Mich.

[73] Assignee: Irvin Industries Inc., Stamford, Conn.

[21] Appl. No.: 950,391

[22] Filed: Oct. 16, 1978

[51] Int. Cl.³ .............................................. B60R 5/04
[52] U.S. Cl. ................................. 296/37.16; 160/306
[58] Field of Search ................. 296/83, 141, 138, 143, 296/139, 145, 140, 98, 100, 136, 37.8, 37.16; 160/306, 323 R, 325, 326

[56] References Cited

U.S. PATENT DOCUMENTS

| 704,738 | 7/1902 | Edwards | 160/306 X |
|---|---|---|---|
| 4,009,745 | 3/1977 | Erpenbeck | 160/326 X |
| 4,127,301 | 11/1978 | Syronik | 296/37.16 |
| 4,139,231 | 2/1979 | Lang et al. | 296/37.16 |

OTHER PUBLICATIONS

James E. White, Disclosure Document No. 065904.

Primary Examiner—John J. Love
Assistant Examiner—Norman L. Stack
Attorney, Agent, or Firm—McAulay, Fields, Fisher & Goldstein

[57] ABSTRACT

An automobile compartment cover, for use in covering a compartment such as the windowed rear compartment of a hatchback or a station wagon type automotive vehicle, has a variable length elongated hollow cylindrical roller about which is rolled a flexible sheet member. At least one end of the roller includes a torsional spring to provide rotational tension on the cover; and compressional spring means to provide longitudinal tension in the roller.

8 Claims, 14 Drawing Figures

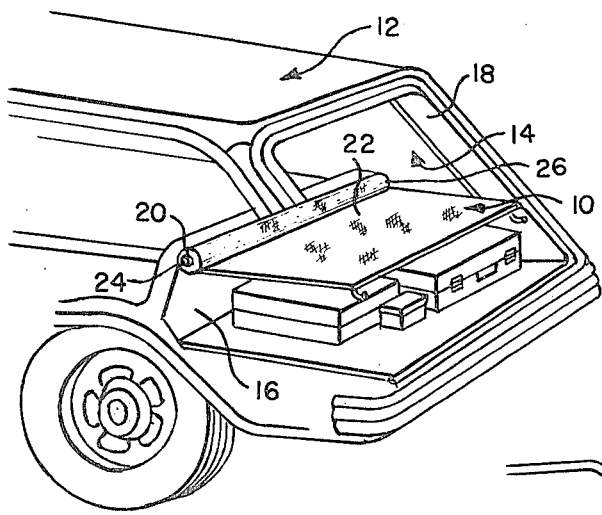
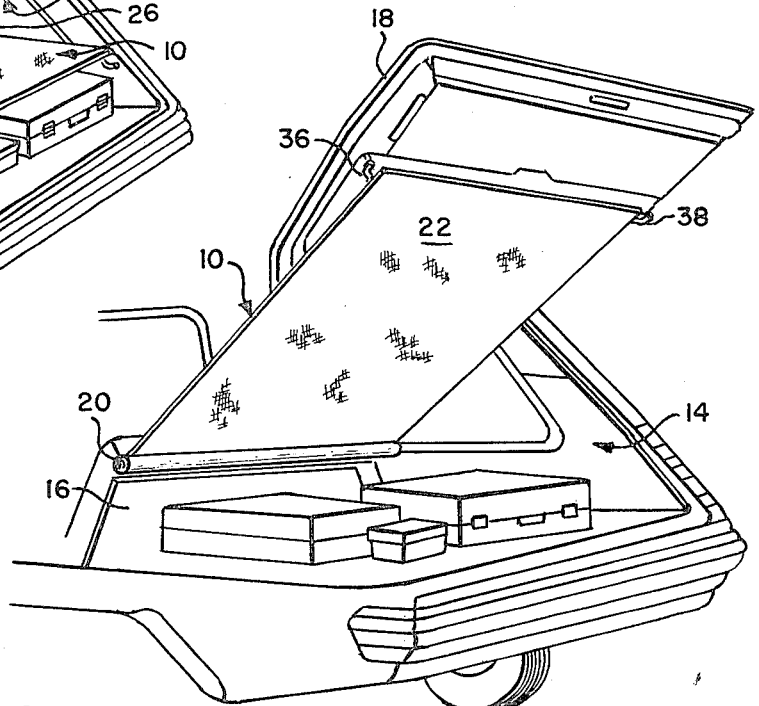
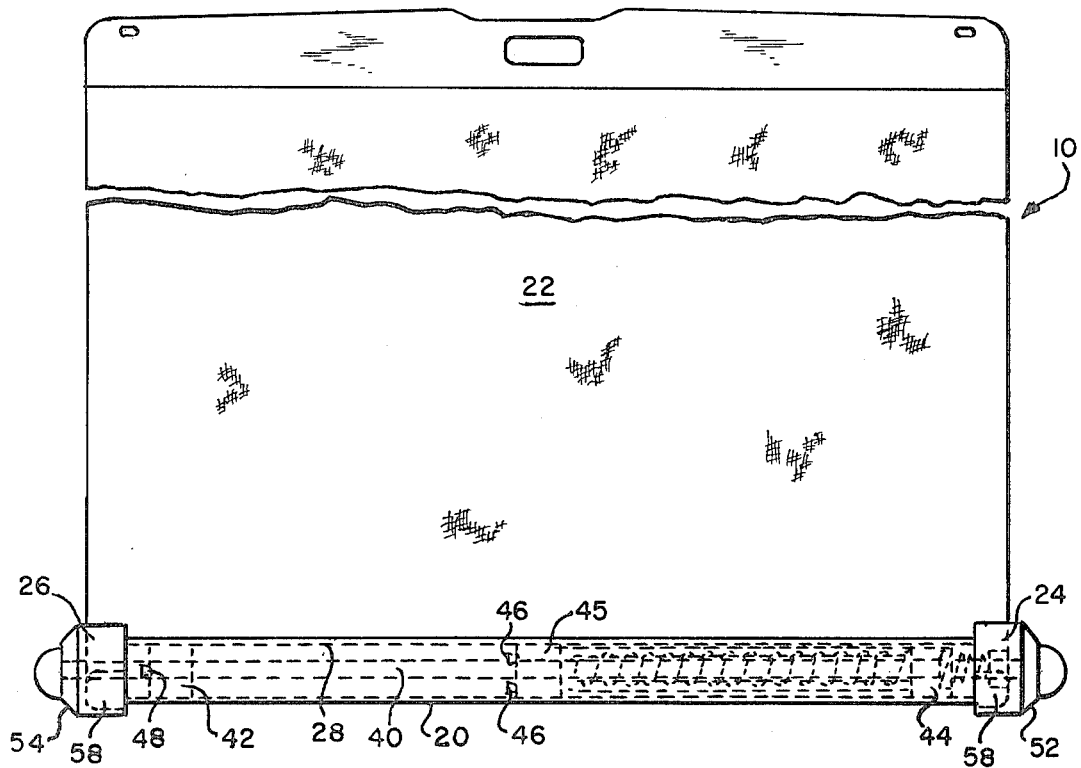

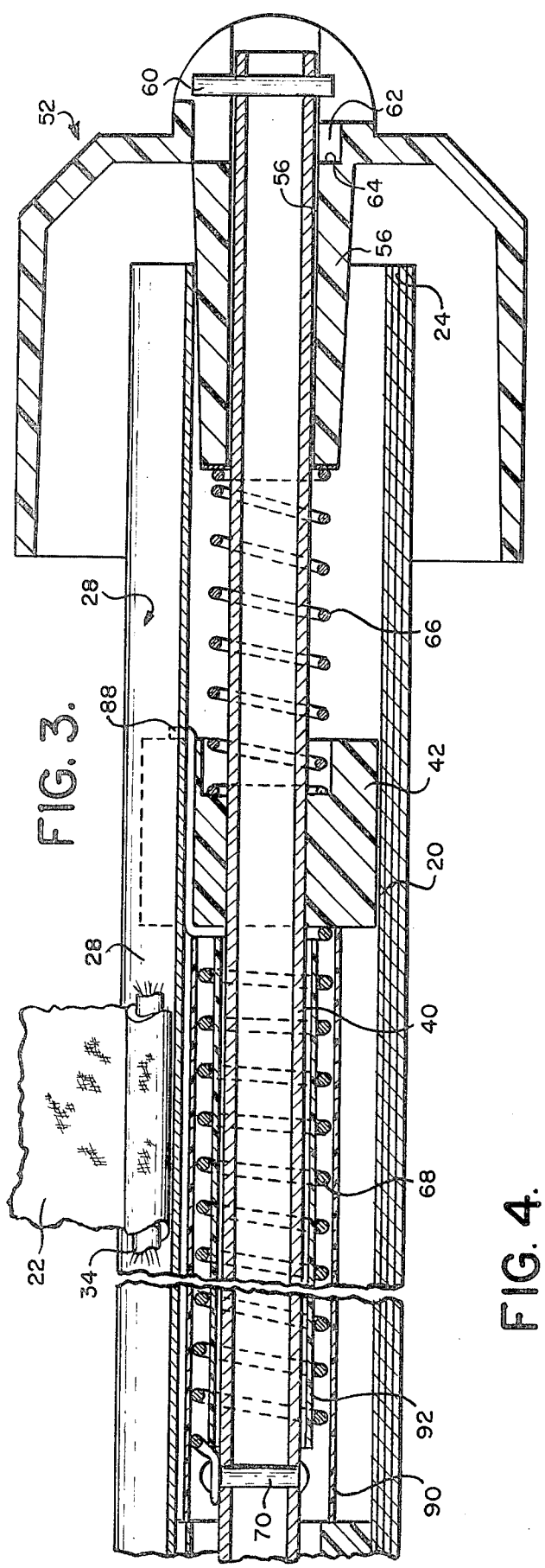
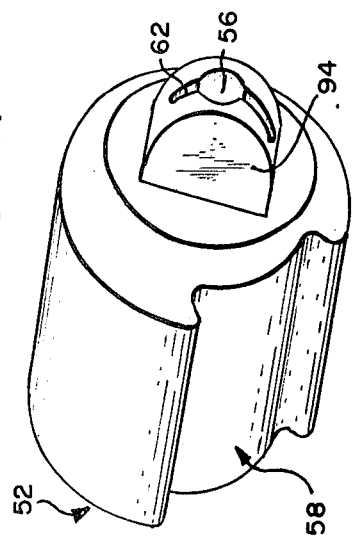
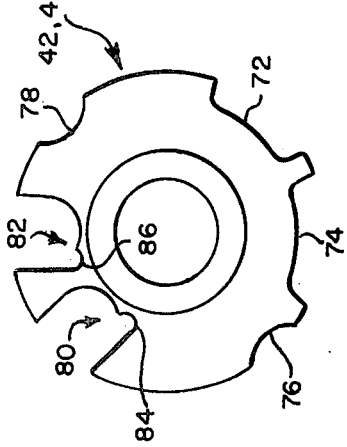
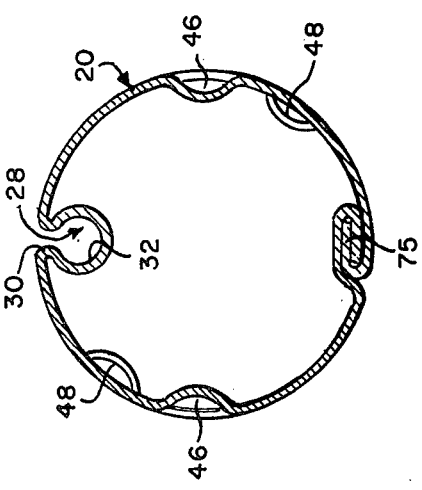

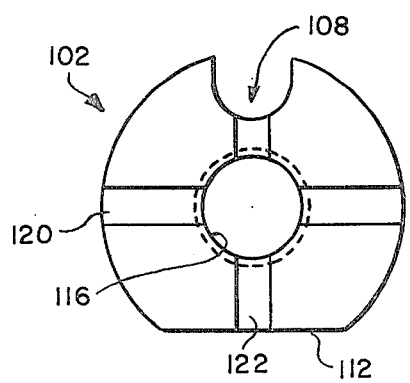
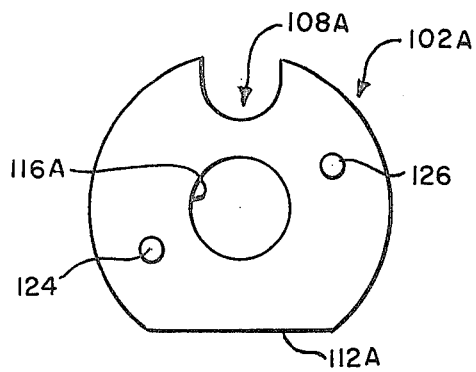
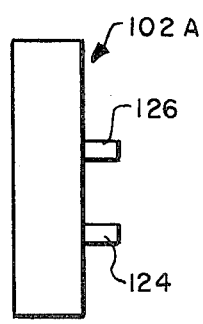
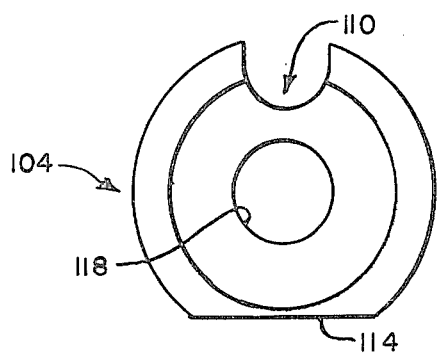
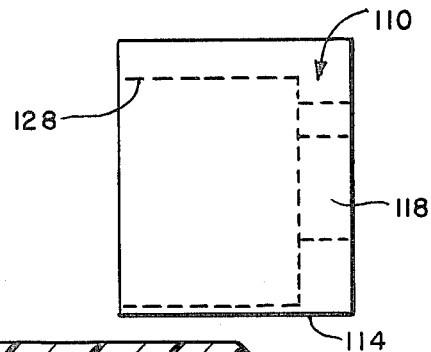
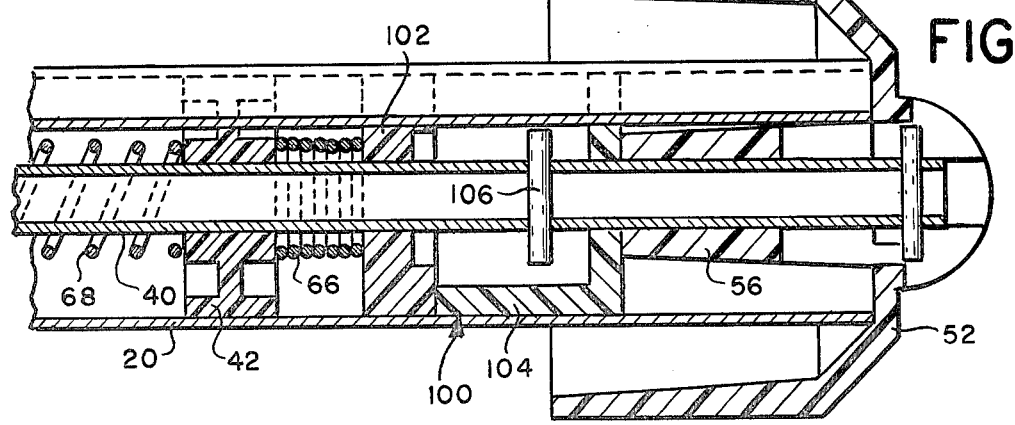
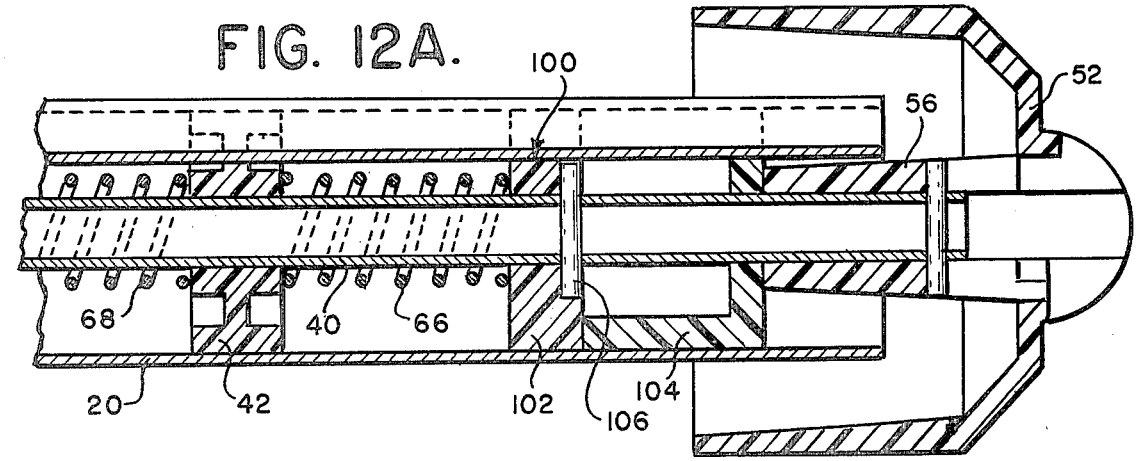

AUTOMOBILE COMPARTMENT COVER

BACKGROUND

For many reasons the current trend in automobiles is toward smaller "compact" type vehicles. Better gas mileage is one reason which is obvious to anyone purchasing petroleum products at recently inflated prices.

A second reason for the popularity of "compacts" is the ease with which smaller cars can negotiate the crowded urban and suburban traffic conditions and even more crowded urban and suburban parking areas. This makes the "compact" cars a particularly favorable choice as a second car for local driving and as a means to reach public transportation.

In order to make the smaller cars more useful and, therefore, more attractive, a number of "compacts" are made in the form of a so-called hatchback. These vehicles are a hybrid of a sedan and a station wagon. The rear seat often folds down and a rear hatch opens to give a relatively large cargo area, thus doubling the usefulness of the vehicle.

Unfortunately, in just those crowded areas where a compact automobile is particularly useful, there is also an increased risk that one's automobile will be broken into. This is especially true where one can determine by mere inspection that valuable items may be stored in the cargo area of the automobile. Thus a hatchback or station wagon containing what appears to be valuable cargo is a particularly attractive target for a thief. One need only look into a rear window or side window to determine whether there is anything which appears to be valuable and, if so, determine if the risks inherent in breaking into the vehicle are worth the rewards.

Merely throwing a cover or drop cloth over items contained in the visible compartment of a hatchback or station wagon may reduce the chances that the cargo will be considered valuable—or may pique the curiosity of a possible thief due to the shape of the objects as reflected in the way the cover is draped or because of the presence of the cover itself.

It is therefore an object of this invention to provide a cover for an automobile compartment. It is a related object to provide a cover for an automobile compartment such as a windowed rear compartment for use in concealing from outside view, items stored in a normally visible rear compartment of an automobile vehicle.

It is a further object of this invention to provide a rear compartment cover which appears the same whether there are items stored beneath it or not.

It is further object of the invention to provide a rear compartment cover which does not restrict access to the rear compartment when the hatch or rear door is opened. It is a related object of this invention to provide a rear compartment cover which can be left in place as a permanent fixture so as not to arouse curiosity by its presence.

It is a further object of the invention to provide a compartment cover which automatically adjusts to compensate for variations in the placement of support brackets or minor manufacturing and assembly variations. It is a related object to provide a compartment cover that will resist rattling by maintaining tension on its mounting brackets.

Other objects will be set forth below or will be obvious therefrom.

SUMMARY OF THE DISCLOSURE

The objects of the invention are attained by utilizing a substantially rectangular flexible sheet member having sufficient width and length to cover the compartment opening over which it is to be deployed. The sheet member is anchored to, and wrapped around, a hollow cylindrical roller. The roller carries at least two bearings which carry a support shaft substantially coextensively with the central axis of the roller. A torsional spring interconnects the shaft and the roller.

By mounting the shaft on one side of the compartment in a manner which restrains its rotation, the unwinding of the sheet member and its attachment to the opposite side of the compartment from the roller will cause the torsional spring to generate counter-rotary forces to maintain tension on the sheet member thereby presenting a substantially smooth flat surface to the casual observer looking in from outside of the automobile.

By providing sufficient additional length, and attaching the free end of the sheet member to the hatch or upwardly swinging door of the vehicle, the door can be opened without removing the cover. The sheet merely unrolls the additional length necessary to allow opening of the door thereby giving free access to the otherwise covered compartment area.

To provide automatic adjustment to size variations, and restrain rattling of the device, an end portion of the shaft is slidably secured and compression spring loaded with respect to the shaft.

BRIEF DESCRIPTION OF THE DRAWINGS

FIGS. 1A and 1B show an automobile compartment cover according to the present invention, mounted in place in the windowed rear compartment of a station wagon, hatchback or similarly bodied type of vehicle;

FIG. 2 is an elevational view of the automotive rear compartment cover device according to the present invention;

FIG. 3 shows a partial enlarged longitudinal cross-sectional view through the elongated hollow cylindrical roller showing the roller support mechanism including the torsion and compression spring mechanism;

FIG. 4 is a transverse sectional view of an empty elongated hollow cylinder to show the construction thereof;

FIG. 5 is an elevational view of a bearing for use in the elongated hollow cylinder;

FIG. 6 is perspective view of an end cap for use over the ends of the elongated hollow cylinder;

FIG. 7 is an elevational view of a locking member for the torsion spring mechanism;

FIG. 8 is an elevational view of a second embodiment of the locking member of FIG. 7;

FIG. 9 is a side elevational view of the bearing of FIG. 8;

FIG. 10 is an elevational view of an unlocking member for use with either locking member;

FIG. 11 is a side elevational view of the unlocking member of FIG. 10, showing the inter-relationship of various portions in phantom;

FIGS. 12A and 12B are partial sectional views of the compartment cover, similar to FIG. 3, but showing the interaction between the locking and unlocking members.

DESCRIPTION OF THE PREFERRED EMBODIMENT

With reference to FIGS. 1A and 1B, an automobile compartment cover 10 is shown mounted in a station wagon or hatchback bodied automotive vehicle 12 and extended as a cover across the top of the rear compartment 14 of the vehicle 12. The preferred embodiment shown in the drawings is one wherein the compartment cover 10 extends from or near the back of the rear seat 16 of the vehicle 12, across the rear compartment 14 and is attached to the hatch or rear door 18. As shown in FIG. 1B, this manner of attaching the cover 10 permits free access into the rear compartment 14 when the hatch 18 is opened. Attachment may also be to the trim below the hatch of a hatchback.

The compartment cover 10 includes an elongated hollow cylindrical roller 20 having first and second open roller ends 24, 26 (FIG. 2). An anchor groove 28 is formed the length of the cylindrical roller 20 substantially parallel to the central axis of the roller. With reference to FIG. 4, the anchor groove includes a necked slotted opening 30 and an enlarged cross sectional enclosure portion 32. One edge of the flexible sheet member 22 is enlarged as by wrapping it about a boltrope 34 and securing the flexible sheet member 22 thereabout. The flexible sheet member 22 is thin enough to fit through the necked slotted opening 30 of the anchor groove 28 but the enlarged end portion carrying the boltrope 34 will not fit through the necked slotted opening 30. The sheet member 22 can thereby be anchored to the elongated cylindrical roller 20 as shown in FIGS. 2 and 3.

The opposite end of the flexible sheet member 22 may be fitted with hooks, slots or other usual connecting means by which it can be secured to brackets 36, 38 on the hatch 18 as shown in FIG. 1B. Suitable roller support means may be provided for rotatably securing the roller to the rear seat 16, also as shown in FIG. 1B, whereby the compartment cover will be secured across the opening of the compartment.

The roller support means includes a rod or tube 40 which extends along the central axis of the roller 20 and beyond at least the first open end of the roller 24 as shown in FIG. 3. A first and a second bearing 42, 44 are provided in the roller 20 to support the rod 40. It is preferable that the design of bearings 42, be in accordance with the design shown in FIG. 5. This bearing form 42, 44, is designed to fit into the cylindrical roller 20 shown in FIG. 4 and by suitable rotation either be stopped by stops 46, or pass these stops and be stopped by stops 48. As can be seen in FIG. 2, this permits insertion of bearings from one end of the roller 20 and have them be properly spaced throughout the roller. FIG. 2 shows an additional bearing, central bearing 45, which is used especially when the elongated roller 20 is long.

Closing the first and second open roller ends are first and second end caps 52, 54. Each of these end caps 52, 54 has a central socket 56 to receive the ends of the rod 40; and an opening 58 allow passage of the flexible sheet member 22 therethrough, as shown in FIG. 2. Each of said end caps 52 and 54 are disposed over and around the ends of the cylindrical roller 20.

At least a first end of the rod 40 has a peg 60 extending radially therefrom. At least the first end cap 52 includes a slot 62 formed transverse to the socket 56 to receive the peg 60. The slot 62 extends from the end of the socket downwardly and for a portion of the way along the socket whereby the cap can slide back and forth with respect to the rod 40. The outer extent of the travel of the cap is limited by the abutment of peg 60 with the bottom 64 of the slot 62, as can readily be seen in FIG. 3. Because the slot 62 limits the rotary motion of the peg 60, relative rotational motion between the first end cap 52 and the rod 40 is restrained.

In order to apply an outward bias to end cap 52, a compression spring 66 is provided between the inner edge of socket 56 and the first bearing 42 (FIG. 3). Behind the bearing 42 is a torsion spring 68 which has its inner end secured to the roller 20 by means of a rivet 70 or other similar connector. The other end of the torsion spring 68 passes through the first bearing 42 and is held by the first bearing 42 in abutment with the outside of anchor groove 28 thereby providing a torsion spring connection between the roller 20 and the rod 40.

For a better understanding of the manner in which the outer end of the torsion spring 68 is held in abutment with the anchor groove 28, reference is now made to FIGS. 4 and 5. As can be seen in FIG. 5 the bearing 42, 44, 45 has a generally circular shape with various indentations formed therein. The elongated indentations 72, 74 are designed to permit the bearing to pass the seam 75 which is used to close the roller 20 and form a strong structure (FIG. 4). The round identations 76, 78 are designed to allow the bearing to stop on the first stops 46 or pass the first stops and stop on the second stops 48, depending on the relative orientation of the bearing with the roller 20. The shaped indentations 80, 82 are designed to fit over the anchor groove 28 again depending on the orientation of the bearing with respect to the roller 20. The lower portion of the shaped indentation 80, 82 includes a second rounded indentation 84, 86. It is through this second shaped indentation that the end 88 of the torsion spring 68 passes and is held by the bend shown in FIG. 3 at the end 88 of the torsion spring 68. As can be seen in FIG. 3, end 88 is held in abutment with anchor groove 28.

In order to reduce noise caused by coiling and uncoiling of torsion spring 68, tubes 90 and 92 may be provided on the outer and inner circumference of the torsion spring 68 to buffer the sound caused by the torsion spring moving in contact with rod 40.

FIG. 3 shows the first end of the assembly. This same mechanism can be inserted in the second end of the assembly or, as is shown in FIG. 2, the second end of the assembly can be provided with a cap 26 only.

Finally, as shown in FIG. 6, the outer end of the cap 52 and 54 is provided with a flat sided projection 94 which, when supported in a bracket having a slotted socket (not shown), will prevent the cap from relative rotation with the slotted bracket.

A preferred embodiment of the cover 10 incorporates a locking mechanism 100 to prevent loss of torsional potential energy from torsion spring 68 if the end cap 52 becomes disengages from the slotted bracket when the flexible sheet member 22 is extended.

The locking mechanism 100 includes a locking portion 102 an unlocking portion 104, and a locking pin 106.

Both the locking portion 102, and the unlocking portion 104 are shaped to fit into the hollow cylindrical roller 20. With reference to FIGS. 7–10 both portions are generally circular in cross-section with a diameter approximately equal to that of the inner diameter of roller 20. Comparing FIGS. 7–10 with FIG. 4, the locking portion 102 and the unlocking portion 104 each have, respectively, a rounded groove 108, 110 shaped to receive the enclosure 32; and a flattened bottom section 112, 114 to clear seam 75. These portions 102, 104 of the locking mechanism 100 are therefore operable to be slid into the cylindrical roller 20 and be restrained from rotational movement with respect thereto.

Said locking portion and said unlocking portion each have a bore 116, 118 respectively, formed therethrough and so disposed as to be centrally located when the portions 102, 104 are inserted into the cylinderical roller 20. The bores 116, 118 are thereby operable to act as bearings to support the center rod 40.

The locking portion 102 has, formed on one face as shown in FIG. 7, pin receiving grooves 120 and 122. These grooves extend through the center of the bore 116, and are large enough to receive locking pin 106 therein. In a second embodiment, as shown in FIG. 8, the pin receiving grooves 120, 122 may be replaced with stops such as pegs 124, 126. As will be evident from the description below of the operation of the locking mechanism 100, there need only be one pin receiving groove or one stop for the operation of the device.

With reference to FIGS. 10 and 11, the unlocking portion 104 is in the form of a generally flattened cylinderical rod with a large diameter bore 128 formed on one side as can be seen in FIG. 11. The large diametered bore 128 is formed only partway through the cylinder while the bore 118, which acts as a bearing, is formed completely through. As can be seen in FIGS. 12A and 12B, the diameter of the large bore 128 must be sufficiently large to allow the pin 106 to be received therein. This is required by the operation of the device.

Locking pin 106 is force fitted or otherwise secured through rod 40, generally perpendicular to the elongated axis of rod 40. When assembled and inserted into the cylindrical roller 20, the locking mechanism is disposed between compression spring 66 and end cap 52. As shown in FIG. 12A, compression spring 66 urges the locking portion 102 against the locking pin 106. As the locking portion 102 is secured from rotary motion with respect to the cylinderical roller 20 and the pin is force fitted or otherwise secured to the rod 40, when the locking pin 106 is received in either groove 120, 122, relative rotation between the cylinderical roller 20 and the rod 40 is prevented. With reference to FIG. 8, it can be seen that the locking action of locking portion 108A is analogous to that of locking portion 108. The locking pin 106 is locked from rotary motion by abuttment with peg 124 or 126. Any number of pegs or stops can be used although only one is required. The advantage of a number of pegs 124, 126 or a number of grooves 120, 122, is that rotary motion of the rod 40 is stopped in a shorter period of time or in a smaller number of degrees of relative rotation between the rod 40 and roller 20.

When the locking mechanism is inserted into the cylindrical roller 20, the unlocking portion 104 is in abuttment with the end of socket 56 which forms a part of the end cap 52 (compare with FIG. 3). As shown in FIG. 12B, when the end cap 52 is pressed inwardly the locking portion 102 is displaced from engagement with locking pin 106. Locking pin 106 is received in the large diameter bore 128 of the unlocking portion 104 and is free to spin therein.

Operation of the Device

Although the roller 20 may be secured between two walls or along any wall of the rear compartment 14 over which the cover device, according to the present invention, is to be extended, it is preferable to secure the roller 20 to either the hatch 18 or the back of the rear seat 16; most preferably, as shown in the drawings, to the back of the rear seat 16. The free end of the sheet member 22 is secured to the opposite side of the rear compartment 14; for the most preferred embodiment, to the hatch 18. The length of the sheet member 22 should be sufficient to allow it to be extended far enough so that the hatch 18 can be completely opened as shown in FIG. 1B.

To secure the roller 20 to the roller of the rear seat it is important that the slotted sockets be spaced apart from each other a distance less than the length of the roller 20 with its end caps 52, 54 fully outwardly extended. In this manner, the compression spring 66 will press the end caps 52, 54 against the sockets to reduce rattling and adjust for variations in socket placement. The slots in the sockets receive the flat sided projection 94 thereby preventing rotation of rod 40. As the torsion spring 68 is secured or connected between the rod 40 and the roller 20, rotation of the roller 20 will cause the torsion spring 68 to either tighten or loosen. In normal storage, the sheet member 22 is rolled about the roller 20 in such a direction that by extending the sheet member 22 the roller is caused to rotate in a direction which tightens the torsion spring 68 to generate a counter-rotational force by the torsion spring. This maintains the flexible sheet member 20 in a taut condition when extended and causes it to automatically rewind on the roller should its free end be released. The free end of flexible sheet member 20 is extended across the compartment and secured to brackets 36, 38 or the like.

For use as a thermal barrier on a van type vehicle, the most convenient method of mounting is with the roller 20 mounted on the ceiling and brackets 36, 38 mounted on the floor. The sheet member 22 can then be extended downwardly and attached to the floor to act as a thermal barrier.

It has been found that, on occasion, when the compartment cover 10 has been disposed over a compartment, the end caps 52, 54 sometimes are accidentally displaced from their respective slotted sockets. This can occur as a result of an accidental bumping against the end of the cover by someone removing an item from the compartment. This may also possible occur when the end cap is jiggled from its slotted socket by excessive vibration or by items stored in the compartment bouncing against the end cap. In any case, the result is that the end cap can become free to spin causing loss of torsional potential stored in the torsion spring 66. The locking mechanism 100, when provided in the cover, will prevent the loss of torsional potential from torsion spring, by automatically locking the cylinderical roller 20 to the rod 40. As shown in FIG. 12A, when the compression spring 66 is fully extended, that is when the end cap is at its outward travel position, the locking pin 104 is received in a groove 120, 122 in the locking portion 102. Alternatively, it abutts a peg 124, 126 when an alternative locking portion 102A is used.

When the compartment cover is mounted the end caps are pressed slightly inwardly to be received, under tension, in their respective slotted sockets. As shown in FIG. 12B, this results in an unlocking of the locking pin 106 from the locking portion 102. The compartment cover will now operate freely. Should an end cap accidentially be released and thereby be forced outwardly by compression spring 66, the locking pin will once again be forced into engagement with locking portion 102 to prevent loss of torsional potential from the torsion spring 68. As is readily realized, providing several pin stops will reduce the amount of loss.

The above is intended as illustrative of preferred embodiments of the present invention, as other modifications and variations would be obvious to persons of ordinary skill in the art. The scope of the invention should therefore be limited only as is defined in the claims below.

What is claimed is:

1. In a motor vehicle compartment cover device to be mounted on brackets secured to an automobile and having a cover sheet to be disposed over a compartment in a motor vehicle, said cover device being of the type having an elongated hollow cylindrical roller around which said cover sheet may be wound and to which said cover sheet is anchored, a roller support means to support said roller in the brackets, and a torsion spring disposed between said roller and said support means and operable to generate torsional forces between said roller and said roller support means, the improvement comprising bracket sensing means operable to generate a first signal in response to the mounting of said device in the mounting brackets, and to generate a second signal in response to the removal of said device from the mounting brackets; and a lock means connected to said bracket sensing means and disposed between said roller support means and said roller, said lock means being switched in response to said first signal from a lock mode wherein it locks the roller from rotation with respect to said support means, to an unlock mode wherein the roller is free to rotate with respect to said support means; and switched from said unlocked mode to said lock mode in response to said second signal, to restrain loss of torsion in said torsion spring.

2. In a motor vehicle compartment cover device to be mounted on brackets secured to an automobile and having a cover sheet to be disposed over a compartment in a motor vehicle, the cover device being of the type having an elongated hollow cylindrical roller around which the cover sheet may be wound and to which one end of the cover sheet is anchored, a roller support to support the roller in the brackets, and a torsional spring disposed between the roller and the roller support and operable to generate torsional forces between the roller and the roller support for winding the sheet on the roller; the improvement comprising said roller support including first and second end caps operable to be supported by the mounting brackets, said first end cap being movable with respect to said second end cap in a direction substantially parallel to the central axis of the roller between an inboard and an outboard position, the distance between said end caps being shorter when said first end cap is in said inboard position than when said first end cap is in said outboard position, and a spring biasing said first end cap to said outboard position to generate a force against the mounting brackets when the device is mounted on the brackets and to restrain accidental removal of the device therefrom.

3. The device of claim 2 further comprising:

a lock disposed between said roller support and said roller and being switchable between a lock mode wherein it locks the roller from rotation with respect to said roller support and an unlock mode wherein the roller is free to rotate with respect to said roller support, said lock being operably connected to said first end cap to be switched into said lock mode when said first end cap is in its outboard position thereby restraining loss of torsion in said torsion spring, and to be switched into its unlock mode when said end cap moves inboard of a predetermined position to maintain spring torsion forces on the sheet member.

4. The device of claim 3 wherein said roller has first and second ends, said first end cap being disposed near said first end and said second end cap being disposed near said second end, said roller support comprising a rod member having a first and second rod end and extending axially through the roller, said first rod end extending beyond said first open end of said roller; and a first and a second bearing disposed in said roller near said first and second roller ends respectively and rotatably supporting said rod member along the central axis of said roller;

said first and second end caps each including a central socket for receiving said first and second ends respectively of said rod member; and said biasing spring comprising a compression spring disposed between said first bearing and said first end cap to bias said first end cap in an axial direction.

5. The motor vehicle compartment cover device of claim 4, comprising:

first and second interengagable locking members; and an unlocking member being operable to disengage said locking members, said first locking member being secured to and extending radially outwardly of said rod member, said second locking member being secured to said roller, said locking members when interengaged, locking said roller from rotation with respect to said rod member.

6. The motor vehicle compartment cover of claim 5, wherein said first locking member comprises a pin disposed through and having portions extending radially outwardly of said rod member; and said unlocking member defines a cylindrical cavity operable to receive said radially outwardly extending portion of said pin and having blocking portions to prevent entry into said cavity of said second locking member, to provide for disengagement of said pin from said second locking member.

7. The device of claim 2 or 3 wherein said roller has first and second ends, said first and second end caps being disposed at said first and second ends respectively;

said roller support comprises a rod having a first end extending coaxially with said roller to a position at said first end of said roller;

said first end cap including a socket receiving said rod first end for relative axial movement therebetween;

said lock comprising first and second interengagable locking members being normally biased into locking engagement;

said first locking member being secured to said rod member;

said second locking member being secured from rotational movement and being free for axial movement relative to said roller;

said first end cap being operably connected to said second member to move said second locking member out of engagement with said first locking member when said cap is slid in an inboard direction along said rod.

8. The device of claim 3 or 7 further comprising a peg member extending radially through said rod near said first rod end, and said first end cap including a cap groove extending axially for a portion of said cap and opening into said first cap socket for receiving said peg member allowing movement of said cap axially with respect to said rod, between said inboard and outboard positions of said first cap but restraining rotational movement of said first cap with respect to said rod.

* * * * *